United States Patent [19]
Roll et al.

[11] Patent Number: 5,783,078
[45] Date of Patent: Jul. 21, 1998

[54] FUEL/WATER SEPARATOR FILTER WITHOUT FLOW DIVERTERS AND METHOD OF MAKING SAME

[75] Inventors: Mark Allen Roll, Bessemer City; Willie Luther Stamey, Jr., Kings Mountain, both of N.C.

[73] Assignee: Dana Corporation, Toledo, Ohio

[21] Appl. No.: 542,406

[22] Filed: Oct. 12, 1996

[51] Int. Cl.$^6$ .................................................. B01D 35/30
[52] U.S. Cl. .................. 210/444; 210/450; 210/461; 210/462; 156/69; 156/293
[58] Field of Search .................. 210/299, 438, 210/440, 441, 444, 450, DIG. 17, 459–462, 437, 443, 448, 454, 455; 156/69, 293; 285/915; 277/178, 189, 214

[56] References Cited

U.S. PATENT DOCUMENTS

| | | | |
|---|---|---|---|
| 166,735 | 8/1875 | Walworth | 285/915 |
| 1,742,743 | 1/1930 | Worbois . | |
| 1,805,903 | 5/1931 | Bull . | |
| 1,861,576 | 6/1932 | Liddell . | |
| 1,951,484 | 3/1934 | Lawes | 210/164 |
| 2,185,281 | 1/1940 | Tear | 210/441 |
| 2,418,777 | 4/1947 | LeClair | 210/166 |
| 2,478,109 | 8/1949 | Kamrath | 210/165 |
| 2,507,818 | 5/1950 | Sager | 210/183 |
| 2,524,336 | 10/1950 | Vokes | 210/187 |
| 2,651,414 | 9/1953 | Lawson | 210/43 |
| 3,122,501 | 2/1964 | Hultgren | 210/94 |
| 3,225,929 | 12/1965 | Sicard | 210/232 |
| 3,228,527 | 1/1966 | McPherson | 210/307 |
| 3,265,213 | 8/1966 | Decker et al. | 210/136 |
| 3,280,981 | 10/1966 | Renfrew | 210/197 |
| 3,297,160 | 1/1967 | Humbert, Jr. | 210/440 |
| 3,312,351 | 4/1967 | Kasten | 210/307 |
| 3,333,703 | 8/1967 | Scavuzzo et al. | 210/232 |
| 3,434,601 | 3/1969 | Barth et al. | 210/440 |
| 3,485,380 | 12/1969 | Offer et al. | 210/444 |
| 3,502,218 | 3/1970 | Tuffnell et al. | 210/305 |
| 3,508,658 | 4/1970 | McVay | 210/14 |
| 3,722,691 | 3/1973 | Francois | 210/304 |
| 3,726,403 | 4/1973 | Shaltis | 210/132 |
| 3,727,764 | 4/1973 | Ogden | 210/232 |

(List continued on next page.)

FOREIGN PATENT DOCUMENTS

| | | |
|---|---|---|
| 52-47372 | 4/1977 | Japan . |
| 53-122777 | 9/1978 | Japan . |
| 57-148055 | 9/1982 | Japan . |
| 57-177508 | 11/1982 | Japan . |
| 57-202743 | 12/1982 | Japan . |
| 58-156317 | 9/1983 | Japan . |
| 59-156164 | 10/1984 | Japan . |
| 59-184908 | 12/1984 | Japan . |
| 1131582 | 10/1968 | United Kingdom . |
| 2078536 | 1/1982 | United Kingdom . |
| 2115305 | 9/1983 | United Kingdom . |

OTHER PUBLICATIONS

Purolator GP18–02 Filter brochure (admitted prior art).

*Primary Examiner*—Matthew O. Savage
*Attorney, Agent, or Firm*—Michael J. Bell; Howrey & Simon

[57] ABSTRACT

A filter assembly having a replaceable coalescing filter in which contaminants are separated from fuel, oil, or the like. The filter assembly has an outer housing that may be constructed from a cylindrical metal container and a top metal plate. A filter element is attached in a cantilever manner to the metal plate, by chemical bonding and/or mechanical locking, solely by way of an support member. The filter element is thus suspended from the plate leaving a clearance space between the bottom filter cap and the bottom of the filter container. No elements are disposed in the clearance space, thus maximizing the efficiency of the filter. The support member may be made of rubber or similar material suitable for sealing the inner and outer fuel chambers and for chemically bonding to the metal housing. The upper end cap of the filter element also may be chemically bonded to the element support. As an alternative, the support member may be a metal or plastic screw lock that engages threads on both the metal plate and the upper end cap of the filter element.

37 Claims, 4 Drawing Sheets

U.S. PATENT DOCUMENTS

| | | | |
|---|---|---|---|
| 3,859,216 | 1/1975 | Sisson et al. | 210/440 |
| 3,920,553 | 11/1975 | Cilento | 210/232 |
| 3,935,106 | 1/1976 | Lipner | 210/232 |
| 4,052,307 | 10/1977 | Humbert jr. | 210/130 |
| 4,083,780 | 4/1978 | Call | 210/23 H |
| 4,241,787 | 12/1980 | Price | 166/105 |
| 4,253,954 | 3/1981 | Midkiff et al. | 210/168 |
| 4,257,890 | 3/1981 | Hurner | 210/112 |
| 4,268,384 | 5/1981 | Rosaen et al. | 210/133 |
| 4,292,179 | 9/1981 | Stone et al. | 210/443 |
| 4,296,810 | 10/1981 | Price | 166/265 |
| 4,298,465 | 11/1981 | Druffel | 210/304 |
| 4,324,660 | 4/1982 | Peyton et al. | 210/440 |
| 4,349,438 | 9/1982 | Sims | 210/180 |
| 4,364,829 | 12/1982 | Atkins et al. | 210/238 |
| 4,369,113 | 1/1983 | Stifelman | 210/440 |
| 4,372,847 | 2/1983 | Lewis | 210/86 |
| 4,425,239 | 1/1984 | Jacocks et al. | 210/787 |
| 4,428,351 | 1/1984 | Davis | 1223/557 |
| 4,437,986 | 3/1984 | Hutchins et al. | 210/130 |
| 4,465,595 | 8/1984 | Cooper | 210/238 |
| 4,473,471 | 9/1984 | Robichaud et al. | 210/443 |
| 4,495,069 | 1/1985 | Davis | 210/114 |
| 4,497,706 | 2/1985 | Pickett et al. | 210/130 |
| 4,502,955 | 3/1985 | Schaupp | 210/149 |
| 4,502,956 | 3/1985 | Wilson et al. | 210/248 |
| 4,522,712 | 6/1985 | Fischer et al. | 210/86 |
| 4,539,109 | 9/1985 | Davis | 210/104 |
| 4,541,265 | 9/1985 | Dye et al. | 72/349 |
| 4,565,629 | 1/1986 | Wilson et al. | 210/248 |
| 4,585,924 | 4/1986 | Pakula | 219/205 |
| 4,617,118 | 10/1986 | Smart | 210/232 |
| 4,619,764 | 10/1986 | Church et al. | 210/248 |
| 4,626,348 | 12/1986 | Stone | 210/248 |
| 4,654,142 | 3/1987 | Thomsen et al. | 210/232 |
| 4,668,393 | 5/1987 | Stone | 210/304 |
| 4,676,895 | 6/1987 | Davis | 210/184 |
| 4,680,110 | 7/1987 | Davis | 210/114 |
| 4,692,245 | 9/1987 | Church et al. | 210/232 |
| 4,740,299 | 4/1988 | Popoff et al. | 210/232 |
| 4,764,275 | 8/1988 | Robichaud | 210/232 |
| 4,836,923 | 6/1989 | Popoff et al. | 210/232 |
| 4,855,041 | 8/1989 | Church et al. | 210/120 |
| 4,992,166 | 2/1991 | Lowsky et al. | 210/130 |
| 4,997,555 | 3/1991 | Church et al. | 210/136 |
| 5,104,537 | 4/1992 | Stifelman et al. | 210/440 |
| 5,171,430 | 12/1992 | Beach et al. | 210/94 |
| 5,244,571 | 9/1993 | Church et al. | 210/232 |
| 5,362,389 | 11/1994 | Hardison et al. | 210/232 |
| 5,462,658 | 10/1995 | Sem | 210/172 |

FUEL/WATER SEPARATOR FILTER WITHOUT FLOW DIVERTERS AND METHOD OF MAKING SAME

BACKGROUND OF THE INVENTION

1. Field of the Invention

This invention relates generally to a replaceable filter assembly for a spin-on coalescing filter in which the filter element is suspended at a clearance from the bottom of the housing without the use of flow diverters, springs, washers, or the like, and more particularly, to an improved replaceable filter assembly.

2. Description of Related Art

Conventional spin-on fuel filters are used to separate contaminants, such as unwanted water, from fuel systems. The typical spin-on fuel filter utilizes the centripetal forces of the fluids to separate water from fuel oil, lubricating oil, diesel fuel, or the like. The known fuel filter has a cylindrical outer container in which an annular or cylindrical filter element is disposed coaxially. The unfiltered fuel enters the top portion of the container through an upper plate having a number of holes. The fuel then flows radially inward through the filter element to the middle of the filter where there is a threaded filter outlet concentric with the longitudinal axis of the filter. Alternatively, the filter inlet and outlet may be reversed such that the flow is radially outward through the filter element. In either event, water droplets fall to the bottom of the filter container where they are collected in a bowl removably connected thereto by threads. A typical spin-on filter of this type is described in U.S. Pat. No. 4,626,348 to Stone, for example.

There have been several different techniques for mounting the filter element inside the filter. In all cases, however, it is necessary to seal the filter element to the upper plate through which the fuel enters, in order to isolate the inlet and outlet flow paths.

In one known method for mounting the filter element, a compression spring is disposed between the bottom of the filter element and the base of the outer container. The filter is thereby urged against the upper plate by the spring. Such an assembly is described, e.g., in U.S. Pat. Nos. 3,434,601 to Barth et al., 4,253,954 to Midkiff et al., and 4,292,179 to Stone et al. This method is considered disadvantageous for several reasons. First, the provision of the compression spring makes the filter more difficult to assemble and more expensive, reducing the mass-producibility of the device. Second, the provision of the spring or other biasing means takes up vital space inside the filter, thus reducing the efficiency of the filter. The biasing means also makes replacement of the filter more difficult. Finally, in many situations, the use of a biasing means necessitates the provision of flow diverters to help channel the flow of the fuel and/or removed water. These flow diverters, which can take the form of ribs, make the machining process more complex and expensive.

An alternative method of securing the filter onto the filter head by supporting the filter at its bottom is disclosed in U.S. Pat. No. 4,740,299 to Popoff et al. In several of the embodiments disclosed in this patent, a plastic annular threaded ring is provided in a bottom portion of the outer housing. In general, the ring spaces the filter element from the bottom of the housing, has threads for attaching the collection bowl to the filter, and may also direct contaminant flow into the collection bowl. In one specific embodiment of Popoff et al., the bottom end cap of the filter rests on top of the threaded ring and the collection bowl engaged therewith. As the collection bowl is threaded onto the ring, the collection bowl abuts against a seal provided in the lower end cap of the filter; the lower end cap has radial ridges forming contaminant flow paths to the collection bowl (see FIG. 6 of Popoff et al.). In another embodiment, the annular threaded ring is a support ring provided with outwardly facing threads for engaging the inwardly facing threads on a collection bowl. The support ring also has radial ribs projecting upward from the ring, which support the bottom of the lower end cap and form contaminant flow channels between the ribs (see FIG. 11). Use of such a spacer ring reduces the area available for contaminant flow and water collection, and thereby reduces the efficiency of the filter. Moreover, even if radial ribs are added to the ring to provide the necessary flow paths, these ribs increase the cost and complexity of the machining the filter.

A filter that suffers from similar disadvantages as Popoff et al. is described in U.S. Pat. No. 5,362,389 to Hardison et al. In Hardison et al., the outer housing is provided with two turned-in portions, one near the top and the other near the bottom. Disposed in abutment with the turned-in portions are ring-shaped members which have inwardly facing threads. The upper ring-shaped member threads onto the filter head, and the containment bowl threads onto the lower ring-shaped member. The filter end caps are provided with radial ribs which fit into grooves in the ring-shaped members. These ribs, like the ribs in Popoff et al., form flow channels therebetween. Thus, the upper ring-shaped member secures the upper end cap of the filter onto the filter head when they are threaded onto the filter head, and the lower ring-shaped member secures the lower end cap of the filter from below.

Like Popoff et al., the arrangement in Hardison et al. fixes the filter element at both ends and provides ribs for structural and flow diversion purposes. Hardison et al., shares some of the problems associated with Popoff et al., and suffers from additional deficiencies. First, the machining required to manufacture the various annular members with both radial ribs and threads is very complex. Complex machining increases both the time and the cost required to produce the element. Moreover, the ring-shaped members and the filter end caps of Hardison et al. are solely in contact where the radial ribs of the latter fit into the grooves of the former. The compressive load produced when the ring-shaped members are threaded onto the filter head and the collection bowl is not evenly distributed to the filter end caps, but instead is transmitted only at the ribs, thereby localizing the compressive load and increasing the risk of failure. Furthermore, by providing ribs as flow diverters, more of the internal space of the filter housing is occupied, and therefore less fuel can be filtered or less space is available for water collection.

Another method of mounting the filter element involves fixing the filter element in a cantilever fashion, thereby leaving a clearance between the bottom of the filter element and the inner floor of the container. Different ways of suspending the filter are described in U.S. Pat. Nos. 3,485,380 to Offer et al. and 5,171,430 to Beach et al., for example.

In Offer et al., a flange of the filter end cap is held tightly against the upper seal, which is in turn held tightly against the top plates. The flange, seal, and plates are held together by a ratchet retaining ring. The ring is placed around a tubular neck, which protrudes from the upper plate, after the seal and flange are attached. The ratchet ring has radially inwardly extending fingers which dig into the tubular neck after the ring is placed on the neck, so as to positively hold the filter element in position against the seal, and positively compress the seal. The ring is preferably made of spring steel. In other words, Offer et al. employs essentially a radial leaf spring to secure the filter end cap to the seal and the seal to the plate. This technique is not desirable because the machining of this ratchet retaining ring is difficult, and the forcing of it into place makes the assembly process slow and expensive. In addition, Offer et al. relies solely upon the resilience of the ratchet ring to hold the flange, seal, and plates together.

Beach et al. discloses various filters in which the filter shell is formed from plastic by both injection and blow molding. The upper end cap of the filter element has tabs which rest on a shoulder that projects from the interior of the filter shell. The filter is thus supported in a cantilever manner by the shoulder formed in the shell. Since the outer container in Beach et al. is made out of plastic, it is difficult to manufacture the outer container to have the inwardly projecting support shoulder. In an alternative embodiment in Beach et al., the filter element is secured to the bottom of the outer container with an adhesive or similar means.

The foregoing review of prior art demonstrates that there is a need for a replaceable fuel filter assembly that is less expensive and easier to manufacture than prior filters, and avoids the use of flow diverters, washers, or springs to increase the efficiency and capacity of the filter, while at the same time facilitating replacement of spent filters.

SUMMARY OF THE INVENTION

The invention solves the above and other problems, and avoids the disadvantages and drawbacks of the above-described art by providing a filter element supported solely in a cantilever fashion by a support member, thereby leaving a clearance between the base of the outer housing and the lower end cap of the filter element. By utilizing this type of structure, the invention maximizes the space available for filtration and water collection, and is thus more efficient than previous filter designs. The invention does not require the provision of flow diverters, washers, springs, or the like, thereby simplifying and reducing the cost of mass production.

More specifically, these features are achieved by providing a filter assembly with a generally cylindrical metal housing having a top portion and a bottom portion. A metal plate may be welded to the top portion of the container for added strength. A hole in the top portion of the housing communicates with an interior portion of the filter assembly, and has threads at its inner surface for replaceably mounting the filter assembly. A filter element supported inside the housing includes an upper end cap and a lower end cap fixedly attached to a filter medium. An inner fuel chamber is disposed inside the filter element, while an outer fuel chamber is disposed between the filter element and the metal housing. A support member is attached between the top portion of the container and the upper end cap, thereby suspending the filter element from the metal plate at a clearance from the bottom of the housing. No elements are disposed in the clearance space between the lower end cap of the filter and the base of the outer housing. The support member also seals the hole and inner fuel chamber from the outer fuel chamber.

In a first embodiment of the invention, the support member is chemically bonded between the top portion of the metal housing and the upper end cap. The support member preferably may be made of rubber or similar material such as nylon, plastic, or open-celled rubber foam. The hole in the top portion of the housing may be formed by a downwardly depending cylindrical projection of the metal plate. A surface of the support member may be chemically bonded to a surface of the metal plate in a position radially outward from the cylindrical projection. This embodiment is superior to the method disclosed in Offer et al., for example, because chemical bonding is less expensive than machining and applying a retaining ring. Moreover, assembly of the invention is made easier by using a chemical bonding agent or adhesive especially suited for the filter environment of the invention, e.g. ethyl cyanoacrylate, rather than having to cast the ring and then force the ring into place. The invention thus greatly enhances the mass-producibility of the product.

In a second embodiment of the invention, the support member may be mechanically locked between top portion of the housing and the upper end cap. The support member may form a mechanical screw lock made from metal or plastic having outwardly facing threads engaging the inwardly facing threads formed on the inner surface of the hole in the top portion of the container. The upper end cap also has inwardly facing threads disposed on its inner circumferential surface. These threads also engage the outwardly facing threads of the screw lock. During assembly, the screw lock may have a chemical applied to the threads, so that the filter may be installed or removed without the screw lock being unthreaded from the housing or upper end cap. By providing this type of structure, relative motion of the plate and top end cap (with respect to the screw lock) is prevented.

In a third embodiment of the invention, the support member may be both chemically bonded and mechanically attached to the top portion of the housing, while the upper end cap may be mechanically attached to the support member. The support member preferably may be made of a resilient material such as rubber, nylon, plastic or open-celled rubber foam. As in the first embodiment, the hole in the top portion of the housing may be formed by a downwardly depending cylindrical projection of a welded, metal plate. At a lower portion of the cylindrical projection, the diameter of the projection increases, so as to form a lip extending radially outwardly. The lip positively engages the support member and holds the resilient element support onto the plate. A chemical bonding agent of the invention may be applied between the support member and the plate. The support member may be provided with a recess for receiving part of the upper end cap. The recess may be smaller than the inner portion of the upper end cap, so as to form an interference fit when the end cap is press-fit into the element support. A chemical bonding agent also may be applied to the recess before the end cap is press-fit therein.

An advantageous method of making the various embodiments of the invention also is disclosed herein.

DETAILED DESCRIPTION

Figure 1:
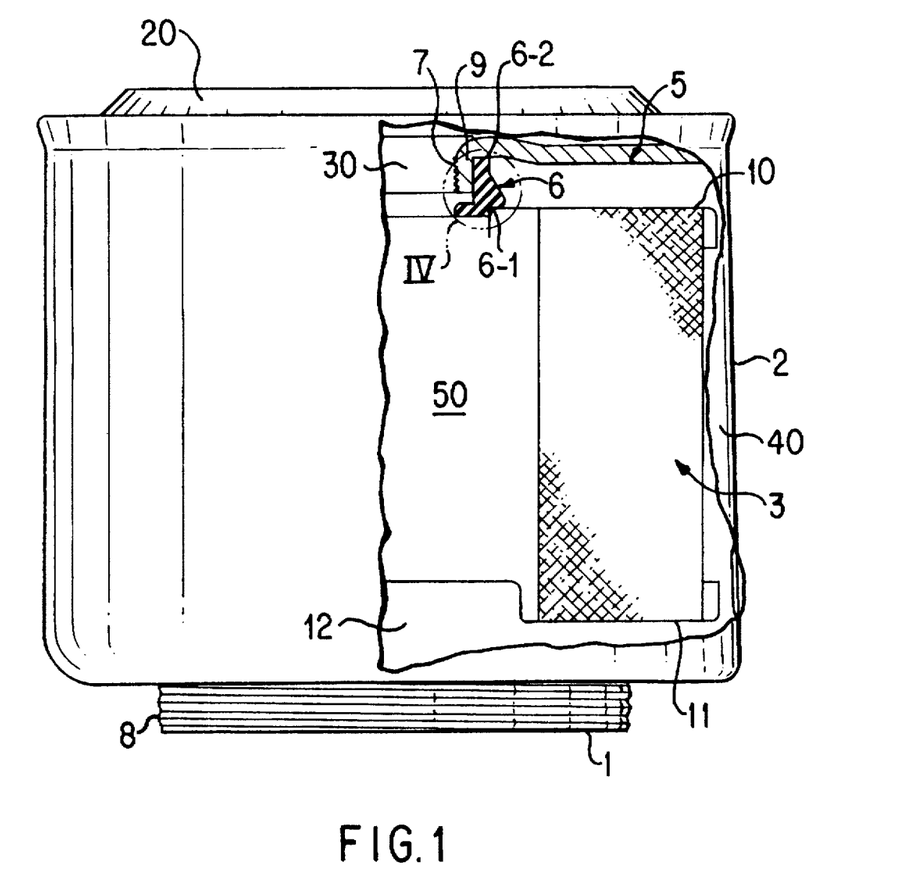
FIG. 1 is a partial sectional view of a first embodiment of the invention illustrating a filter element suspended in a filter housing by a support member chemically bonded to the filter element and housing.

Referring to FIG. 1, the first embodiment of the invention will be described. The filter design has an outer housing that may be constructed from a drawn metal container 2 and an upper plate 5 made from stamped metal. Appropriate metals include cold rolled steel and the like. Plate 5 is welded to a top filter cover having an annular recess (not shown) in which a filter gasket 20 is retained in a conventional manner. The cover and filter housing are connected together by a double seamed seal (not explicitly shown) typical of those employed in conventional oil filters. A rubber element support 6 is chemically bonded, e.g., by an adhesive of the type discussed below, to at least the bottom of plate 5 near a cylindrical projection 9 which downwardly depends from plate 5. Projection 9 forms a central opening 30 having inward facing threads 7 formed on its inner surface for screwing the filter on and off of the engine.

Figure 4:
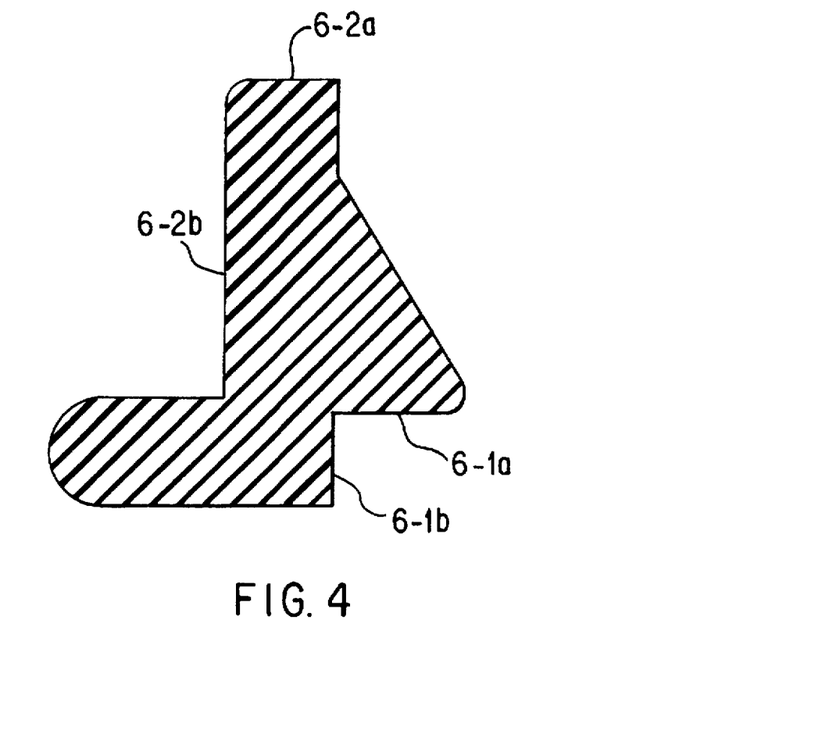
FIG. 4 is an enlarged view of portion IV of FIG. 1 better illustrating the support member of the invention.

The upper and lower end caps 10, 11 of the filter element 3 are preferably made from drawn metal and are fixedly connected to filter element 3 by e.g., using any well known adhesive, such as plastisol. Element support 6 is provided with two mounting surfaces 6-1 and 6-2 for connecting the support to the housing and filter element. Specifically, upper end cap 10 is chemically bonded to mounting surface 6-1, while element support 6 is chemically bonded to plate 5 at mounting surface 6-2. As best shown in FIG. 4, mounting surface 6-1 may take the form of a squared-off groove comprising two essentially flat annular surfaces 6-1a, 6-1b, which are orthogonal to one another. The groove receives an inner portion of the upper end cap and may be connected to the end cap at one or both of the mounting surfaces 6-1a, 6-1b by an adhesive, described subsequently, especially suited for the filter environment of the invention. Mounting surface 6-2 includes a top substantially flat annular surface 6-2a and a cylindrical surface 6-2b; surface 6-2b snugly receives the projection 9, thus positioning a portion of the bottom surface of plate 5 (adjacent to or near projection 9) opposite mounting surface 6-2a. Adhesive of the type described below also may be applied to fixedly connect the support 6 to the plate 5 at one or both of the surfaces 6-2a, 6-2b.

In this way, element support 6 suspends the filter element 3 from plate 5 and supports it in the housing. Filter element 3 is thus suspended from filter cover 5 in a cantilevered manner leaving a clearance space 12 between bottom end cap 11 and the bottom of filter container 2 for water and contaminants to flow to the collection bowl. There are no springs, washers, or other elements disposed between the bottom of the filter container and the filter element. By leaving enough clearance in the space 12 beneath the filter element 3, the volume of outer fuel chamber 40 may be increased significantly, and the filter operates more efficiently.

Element support 6 also serves to seal outer fuel chamber 40 from inner fuel chamber 50 disposed below central opening 30. The only communication between the two fuel chambers is a path through filter element 3, which ensures that all of the fuel will be filtered and no fuel will circumvent filter element 3.

Special adhesives are required for chemically bonding element support 6, because the adhesive must be able to withstand being soaked in the fuel oil (or other medium being filtered), which might tend to dissolve conventional bonding agents. In a laboratory experiment, a conventional filter element was chemically bonded to a metal container and a rubber element support with an adhesive composed of ethyl cyanoacrylate. The bonded assembly was then soaked in No. 2 diesel fuel for 1000 hours. 350 hours of the test included fuel flowing at 90 gallons per hour. Subsequent to the 1000-hour soaking period, the element support continued to fixedly and permanently connect the filter element to the metal plate. Other adhesives that should work satisfactorily include one part epoxies, two part epoxies, and two part urethanes. One part epoxies usually include a blend of epoxy resin and a diglycidal ether of bisphenol A ("DGEBPA"). Two part epoxies would include the resin blend of the single component epoxy, as well as a curing agent, typically a polyalkyl amine or an aliphatic amine. Using a suitable mixture of the resin blend and the curing agent, as is known in the art, causes curing to begin at room temperature. The two part urethane consists of an isocyanate part (typically a mixture of modified methylene diphenyl isocyanate or urethane prepolymer) and a resin part (typically a blend of polyols, fillers, catalysts, and other additives). Again, using a suitable mixture of the isocyanate and resin parts will start curing at room temperature.

Threaded screw part 1, which may be formed from a suitable plastic such as nylon, is connected to the bottom of filter container 2 by conventional glue or similar known means. Threaded part 1 is annular and has outwardly facing threads 8 for engaging corresponding threads on a conventional, removable collection bowl (not shown). A central opening in part 1 (not shown) leads to the collection bowl.

The fuel filter operates to separate contaminants, such as unwanted water, from fuel systems in the generally known manner, as follows. Unfiltered fuel enters the top portion of the container through a number of inlet holes (not shown) disposed in upper plate 5 around the periphery of central opening 30. These holes may be in fluid communication with either the inner or outer fuel chamber 50 or 40. Presuming that the inlet holes communicate with the outer chamber 40, the fuel then flows radially inward through filter element 3 to the inner fuel chamber 50 in the middle of filter element 3. The filtered fuel is conducted from the inner fuel chamber though central outlet opening 30 to the engine. The undesirable contaminants such as water, which are heavier than the fuel, fall to the bottom of outer chamber 40 or are trapped by the filter medium. The contaminants pass through clearance space 12 into the opening in the threaded part 1, which leads to the collection bowl. Alternatively, the filter inlet and outlet may be reversed such that the flow is radially outward through the filter element. That is, unfiltered fuel may enter filter container 2 through the central opening 30, pass into the inner fuel chamber 50, flow radially outwardly through filter element 3 into outer fuel chamber 40, and be forced out through one or more holes (not shown) in plate 5 which surround central opening 30. In this case, at least one opening must be provided in the central portion of lower end cap 11 for the contaminants to flow through, and the outer chamber 40 should be sealed from the clearance space 12.

Figure 2:
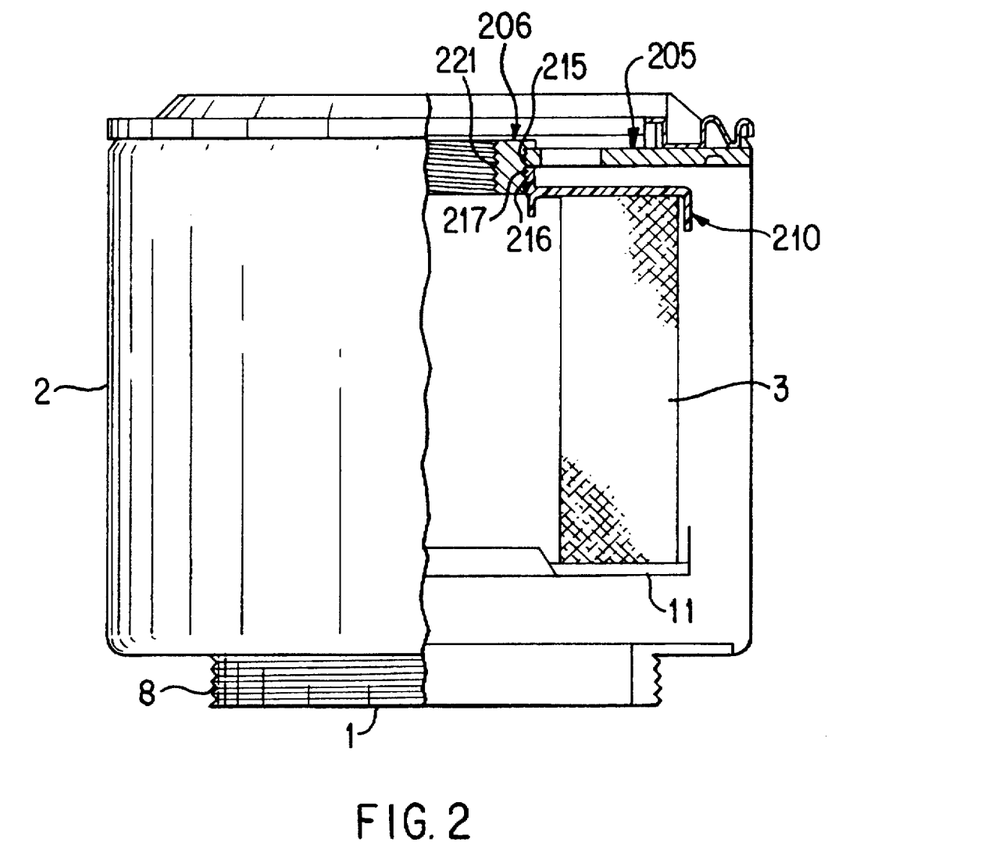
FIG. 2 is a partial sectional view of a second embodiment of the invention illustrating a filter element suspended in a filter housing by a support member mechanically locked to the filter element and housing.

Referring now to FIG. 2, the second embodiment of the invention will be described. Like parts have the same reference numerals as in the previous embodiment, and a description of these parts will not be repeated. Similarly, the operation of the second embodiment of the invention is substantially similar to that of the first embodiment.

Upper plate 205 is preferably constructed from drawn steel, and is provided with inwardly facing female threads 215. Upper end cap 210 is made preferably from molded plastic, and is also provided with inwardly facing female threads 216. As with the first embodiment, the upper end cap 210 is fixedly attached to the filter medium, and the element support 206 is fixedly attached between the upper plate 205 and the upper end cap 210. However, in this embodiment, female threads 216 of upper end cap 210 engage with outwardly facing male threads 217 provided on element support 206, which forms a mechanical screw lock. Similarly, female threads 215 of upper plate 205 also engage the male threads of element support 206. Thus, instead of providing element support 206 with two separate mounting surfaces, as in the previous embodiment, the male threads 217 of element support 206 form the mounting surfaces upon which both upper end cap 210 and plate 205 are secured.

Element support 206 is not only provided with male threads 217, but also has inwardly facing female threads 221, which engage outwardly facing threads provided on the filter head (not shown) to replaceably mount the filter on the engine. During the assembly of the filter, a known chemical, such as LOCTITE may be applied to threads 215, 216, and/or 217 so that filter element 3 may be installed or removed without support 206 being unthreaded from the plate or top end cap. Since relative motion between support 206, plate 205, and end cap 210 is prevented by the chemical, filter element 3 may be attached onto or detached from upper end cap 210 without dislodging either plate 205 or top end cap 210, and filter installation and removal is made significantly easier.

Figure 3:
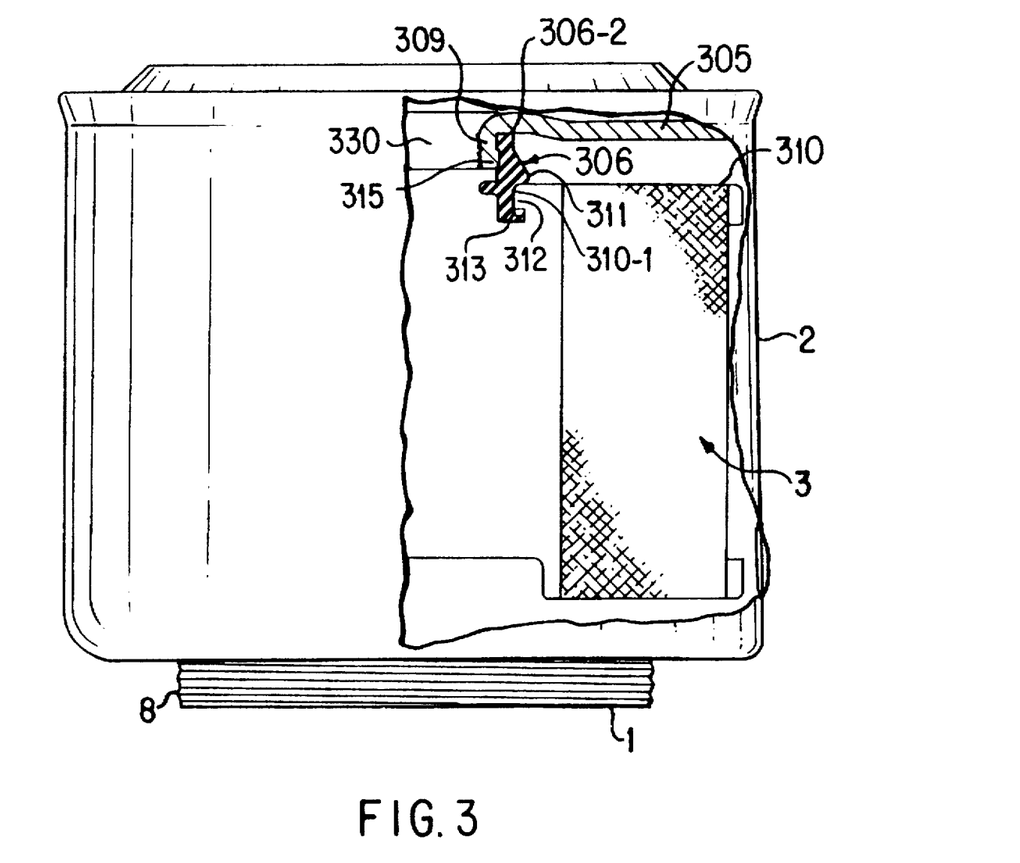
FIG. 3 is a partial sectional view of a third embodiment of the invention illustrating a filter element suspended in a filter housing by a support member employing both chemical bonding and mechanical locking techniques.

Referring now to FIG. 3, the third embodiment of the invention will be described. Like parts have the same reference numerals as in the previous embodiments, and a description of these parts will not be repeated. Again, the operation of the third embodiment of the invention is substantially similar to that of the first embodiment described above.

In this embodiment, a combination of mechanical locking and chemical bonding features are used to suspend the filter element from the housing. In particular, the element support is fixedly attached to the housing by a mechanical feature and an adhesive of the invention, while the upper end cap may be fixed to the element support solely by a mechanical lock. The details of each connection are described below.

Figure 5:
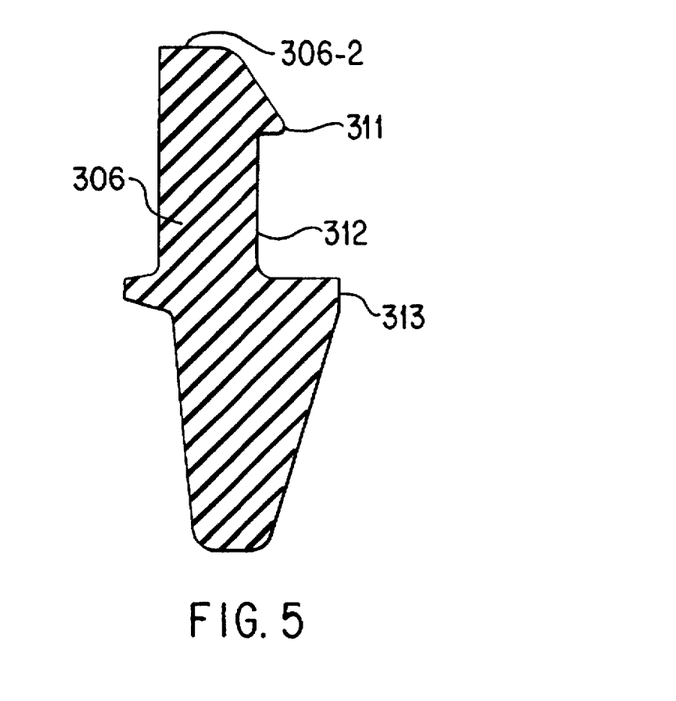
FIG. 5 is an enlarged sectional view of the support member of the FIG. 3 embodiment.

With respect to the connection to the filter housing, in a manner similar to the first embodiment, upper plate 305 is provided with a downwardly depending cylindrical projection 309 which defines a central opening 330. At a lower portion of cylindrical projection 309, the outer diameter of the projection increases to form a circumferential lip 315 that extends radially outward from cylindrical projection 309. Element support 306 is snugly fitted over lip 315 to form an interference fit, i.e., lip 315 positively engages into rubber element support 306, to fixedly secure the element support to the plate mechanically. Element support 306 may also be chemically bonded (using an adhesive of the type described above) at its mounting surface 306-2, shown better in FIG. 5, to upper plate 305 adjacent to the cylindrical projection 309 of plate 305. The dual mechanical-chemical bonding of element support 306 to plate 305 ensures that the element support remains securely fixed to the plate.

The filter element is mechanically fixed to element support in the following manner. As shown best in FIG. 5, element support 306 is provided with an upper annular shoulder 311 and a lower annular shoulder 313. Shoulders 311 and 313 have a greater thickness than the remainder of element support 306, thereby forming a recess or mounting groove 312 therebetween. Mounting groove 312 is adapted to receive downturned rim 310-1 of upper end cap 310; that is, rim 310-1 is interference or press-fit into mounting groove 312. Optionally, a chemical adhesive of the invention may also be applied to the interface between rim 310-1 and groove 312, to assist in fixedly securing the end cap to the element support.

A suitable method of making the invention applicable to all three embodiments is described as follows. First, the upper plate is welded or otherwise fixed to the cover, which forms the top portion of the filter container. The element support is then attached by threading or adhesive or both, to the plate/cover sub-assembly. Separately, the threaded screw part, which is designed to receive a collection bowl, is glued onto the bottom of the filter container. Meanwhile, the filter element is made by attaching the end caps to the filter medium. The filter element is then attached in the appropriate manner (depending upon the embodiment, either chemically, mechanically, or both) to the plate/cover/element support sub-assembly. Finally, the filter container is placed over and sealed to the upper plate and cover, and suitable gaskets are installed.

As described above, the invention provides an inexpensive, easy-to-manufacture fuel filter in which the filter element is supported solely by the element support in a cantilever fashion. No retaining rings or biasing means are used to support the filter element. The invention also does not require the use of ribs as either structural supports or as flow diverters. Thus, the invention is particularly adapted for use as replacement filters for original equipment. The spent filter cartridge may be unthreaded and removed from the filter head and replaced with a new filter cartridge of the type described above.

Numerous changes may be made without departing from the scope or spirit of the invention, which is limited solely by the appended claims. For example, rim 310-1 is depicted in FIG. 3 as being a downturned rim. However, the invention may instead utilize an upturned rim, as well as any other configuration. In addition, the precise shape of the element support is immaterial; the irregularly shaped element support of FIG. 1 may be replaced by an annular element support having a simple rectangular or square cross section, or some other polygonal shape.

What is claimed is:

1. A filter assembly comprising:
a metal housing having a top wall, a bottom wall, and an imperforate sidewall connecting said top wall to said bottom wall, said top wall having a central hole therethrough that communicates with an interior portion of the filter assembly, said hole being defined by a first inwardly facing surface for replaceably mounting the filter assembly;

a filter element, including an upper end cap, a filter medium having first and second ends, and a lower end cap, wherein said first and second ends of said filter medium are in contact with and fixedly attached to said upper and lower end caps, respectively;

an inner fuel chamber disposed inside said filter element, and communicating with said hole;

an outer fuel chamber disposed between an outer periphery of the filter element and said metal housing; and a support member having a first portion fixedly attached to said top wall of said housing and a second portion fixedly attached to said upper end cap of said filter element, wherein said first portion is radially spaced apart from the central hole in the top wall of said housing, wherein at least one of said first and second portions are fixedly attached to said top wall and said upper end cap, respectively, by a chemical bonding agent.

2. A filter assembly according to claim 1, wherein said filter element is supported solely by said support member, and no elements are disposed between said lower end cap and said bottom wall of said housing.

3. A filter assembly according to claim 1, wherein said support member seals the inner and outer fuel chambers from each other.

4. A filter assembly according to claim 3, wherein said top wall of said housing comprises:
 a filter cover;
 a metal plate fixedly connected to said filter cover; and
 a cylindrical projection depending downwardly from said metal plate, wherein said cylindrical projection forms said first inwardly facing surface, and said support member surrounds said cylindrical projection.

5. A filter assembly according to claim 4, wherein an upper surface of said first portion of said support member is fixedly attached by said chemical bonding agent to a lower surface of said metal plate in a position radially outward from said cylindrical projection, and an upper surface of said upper end cap is fixedly attached by said chemical bonding agent to a lower surface of said second portion of said support member.

6. A filter assembly according to claim 4, wherein said cylindrical projection comprises a lip extending radially outwardly to positively engage said first portion of said support member, thereby mechanically locking said first portion of said support member to said metal plate.

7. A filter assembly according to claim 1, wherein said support member is generally annular in shape and said first portion of said support member is fixedly attached to said top wall adjacent said hole.

8. A filter assembly according to claim 1, wherein said first portion of said support member is fixedly attached by said chemical bonding agent to said top wall.

9. A filter assembly according to claim 8, further comprising a cylindrical projection depending downwardly from said top wall of said housing and forming said hole therein, and wherein an outer surface of said cylindrical projection is fixedly attached by said chemical bonding agent to an inner surface of said first portion of said support member.

10. A filter assembly according to claim 1, wherein said support member is made of at least one substance selected from the group consisting essentially of rubber, plastic, nylon, and open-celled rubber foam, and said chemical bonding agent is selected from the group consisting essentially of ethyl cyanoacrylate, one part epoxy, two part epoxy, and two part urethane.

11. A filter assembly according to claim 1, wherein said support member is mechanically locked to said top wall of said housing.

12. A filter assembly according to claim 1, wherein said first portion of said support member is fixedly attached by said chemical bonding agent to said top wall of said housing, and said upper end cap of said filter element is mechanically attached to said second portion of said support member.

13. A filter assembly according to claim 12, wherein said support member is made of at least one resilient material.

14. A filter assembly according to claim 12, wherein said first portion of said support member is further mechanically attached to said top wall of said housing.

15. A filter assembly according to claim 12, wherein said upper end cap of said filter element is further fixedly attached by said chemical bonding agent to said second portion of said support member.

16. A filter assembly according to claim 1, wherein said second portion of said support member includes a recess receiving a mating portion of said upper end cap, said recess being sized smaller than an inner portion of said upper end cap, thereby forming an interference fit supporting said filter element in a cantilever manner.

17. A filter assembly according to claim 16, wherein said chemical bonding agent is disposed in said recess between said second portion said support member and said inner portion of said upper end cap.

18. A filter assembly according to claim 1, wherein said second portion of said support member is fixedly attached by said chemical bonding agent to said upper end cap of the filter element.

19. A method of making a fuel filter having a metal housing with a top portion and a bottom portion, the top portion having a central hole therethrough that communicates with an interior portion of the filter assembly, a first inwardly facing surface formed in the hole for replaceably mounting the filter assembly, and a filter element having an upper end cap, a filter medium, and a lower end cap, said method comprising the steps of:
 providing a support member having a first portion and a second portion;
 applying a chemical bonding agent to one of said first portion and said second portion;
 positioning the first portion in contact with the top portion of the housing such that said first portion is spaced apart from said central hole;
 positioning the second portion in contact with said upper end cap;
 fixedly attaching one of said first portion and said second portion to one of said top portion and said upper end cap, respectively, with said chemical bonding agent; and
 fixedly attaching the other one of said first portion and said second portion to one of said top portion and said upper end cap, respectively, such that a clearance is left between the lower end cap and the bottom portion of the housing.

20. A method of making a fuel filter according to claim 19, wherein said chemical bonding agent selected from the group consisting essentially of ethyl cyanoacrylate, one part epoxy, and two part epoxy, and two part urethane.

21. A method of making a fuel filter assembly according to claim 19, wherein the step of fixedly attaching the upper end cap to the support member comprises mechanically locking the upper end cap and the support member together.

22. A method of making a fuel filter assembly according to claim 21, wherein the step of fixedly attaching the support member to the top portion includes mechanically locking the support member and the top portion together.

23. A method of making a fuel filter assembly according to claim 22, wherein the top portion of the housing has a downwardly depending cylindrical projection and the projection has a lip disposed at a lower portion of the projection, and wherein the step of fixedly attaching the support member to the top portion further comprises the step of fitting the support member over the lip of the projection.

24. A method of making a fuel filter assembly according to claim 21, wherein the support member is provided with a mounting groove adapted to receive mating portion of the upper end cap, and wherein the step of fixedly attaching the upper end cap to the support member comprises the step of press-fitting the mating portion of the upper end cap into the mounting groove of the support member.

25. A method of making a fuel filter assembly according to claim 24, further comprising the step of providing said bonding agent in the mounting groove prior to performing said press-fitting step.

26. A filter assembly comprising:

a metal housing having a top portion and a bottom portion, said top portion having a substantially planar inner surface defining a central hole therethrough that communicates with an interior portion of the filter assembly, said hole being defined by a first inwardly facing surface for replaceably mounting the filter assembly;

a filter element, including an upper end cap, a filter medium, and a lower end cap, said filter medium being fixedly attached to said upper and lower end caps;

an inner fuel chamber disposed inside said filter element, and communicating with said hole;

an outer fuel chamber disposed between an outer periphery of the filter element and said metal housing; and a support member disposed between said top portion of said housing and said upper end cap of said filter element, said support member having first and second portions, said first portion including a mating surface in contact with and conforming to said substantially planar inner surface of said top portion of said housing, wherein said first portion is spaced apart from said central hole in the top portion of said housing, first attaching means disposed at the point of contact between said first portion and said substantially planar inner surface for fixedly attaching said first portion to said substantially planar inner surface such that said first portion of said support member is suspended from said substantially planar inner surface, said second portion of said support member being in contact with said upper end cap of said filter element, and second attaching means disposed at the point of contact between said second portion and said upper end cap for fixedly attaching said second portion to said upper end cap, wherein said filter element is suspended from said top portion of said housing at a clearance from said bottom portion of said housing.

27. A filter assembly according to claim 26, wherein said mating surface is fixedly attached by a chemical bonding agent to said substantially planar inner surface of said top portion of said housing.

28. A filter assembly according to claim 27, further comprising a cylindrical projection depending downwardly from said top portion of said housing and forming said hole therein, wherein said cylindrical projection includes an outer surface fixedly attached by said chemical bonding agent to an inner surface of said first portion of said support member.

29. A filter assembly according to claim 26, wherein said upper end cap is fixedly attached by a chemical bonding agent to said second portion of said support member.

30. A filter assembly according to claim 26, wherein said top portion of said housing comprises:

a filter cover;

a metal plate fixedly connected to said filter cover; and a cylindrical projection depending downwardly from said metal plate, wherein said support member surrounds said cylindrical projection.

31. A filter assembly according to claim 30, wherein said mating surface is fixedly attached by a chemical bonding agent to said metal plate in a position radially outward from said cylindrical projection.

32. A filter assembly according to claim 30, wherein an upper surface of said upper end cap is fixedly attached by a chemical bonding agent to said second portion of said support member.

33. A filter assembly according to claim 26, wherein said upper end cap of the filter element is mechanically locked to said second portion of said support member.

34. A filter assembly according to claim 26, wherein at least said mating surface is fixedly attached to said top portion of said housing by a chemical bonding agent and said first portion of said support member is further fixedly attached to said top portion of said housing by a mechanical connection.

35. A filter assembly according to claim 26, wherein said upper end cap of said filter element is mechanically attached to said second portion of said support member.

36. A filter assembly according to claim 26, wherein said second portion of said support member includes a recess for receiving a mating portion of said upper end cap of the filter element, said recess being sized smaller than an inner portion of said upper end cap, thereby forming an interference fit.

37. A filter assembly according to claim 36, wherein a chemical bonding agent is disposed in said recess between said second portion of said support member and said inner portion of said upper end cap.

* * * * *